United States Patent
Kim

(10) Patent No.: US 11,279,226 B2
(45) Date of Patent: Mar. 22, 2022

(54) STRUCTURE FOR MOUNTING DRIVE DEVICE AND STEERING DEVICE ON VEHICLE BODY OF VEHICLE

(71) Applicants: Hyundai Motor Company, Seoul (KR); Kia Motors Corporation, Seoul (KR)

(72) Inventor: Jooyeon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 227 days.

(21) Appl. No.: 16/685,466

(22) Filed: Nov. 15, 2019

(65) Prior Publication Data

US 2021/0031620 A1  Feb. 4, 2021

(30) Foreign Application Priority Data

Jul. 29, 2019 (KR) .................. 10-2019-0091384

(51) Int. Cl.
| | |
|---|---|
| *B60K 17/00* | (2006.01) |
| *B62D 3/12* | (2006.01) |
| *B60K 20/00* | (2006.01) |
| *B62D 21/09* | (2006.01) |
| *B60K 1/00* | (2006.01) |
| *B62D 5/04* | (2006.01) |

(52) U.S. Cl.
CPC .............. *B60K 17/00* (2013.01); *B60K 1/00* (2013.01); *B60K 20/00* (2013.01); *B62D 3/12* (2013.01); *B62D 5/0424* (2013.01); *B62D 21/09* (2013.01)

(58) Field of Classification Search
CPC . B60K 1/00; B60K 17/00; B62D 3/12; B62D 5/0424; B62D 21/11
USPC .......................................................... 180/252
See application file for complete search history.

(56) References Cited

U.S. PATENT DOCUMENTS

| | | | | |
|---|---|---|---|---|
| 5,715,901 | A * | 2/1998 | Tokushima | ............... F16H 1/06 180/65.6 |
| 5,821,653 | A * | 10/1998 | Kinto | .................. F16H 57/0447 310/89 |
| 6,397,701 | B1* | 6/2002 | Park | ......................... B62D 3/12 74/606 R |
| 6,783,157 | B2* | 8/2004 | Huang | ..................... B60G 7/02 280/124.109 |
| 7,740,278 | B2* | 6/2010 | Kakuta | .................... B62D 3/12 280/777 |
| 2002/0096382 | A1* | 7/2002 | Kielar | .................. B62D 5/0421 180/252 |
| 2011/0067942 | A1* | 3/2011 | Takei | ..................... B60K 11/02 180/291 |
| 2012/0055724 | A1* | 3/2012 | Iwasa | ...................... B60L 53/16 180/68.5 |
| 2014/0015177 | A1* | 1/2014 | Yoneyama | .......... B60K 5/1241 267/141.1 |

* cited by examiner

*Primary Examiner* — Frank B Vanaman
(74) *Attorney, Agent, or Firm* — Slater Matsil, LLP

(57) ABSTRACT

A structure can be used for mounting a driving device and a steering device on a vehicle body of a vehicle. The structure includes a gear box of a steering device mounted on a subframe, a roll mount, a mounting bracket coupled to the roll mount, and a motor/speed reducer assembly fastened to and supported by the gear box by the roll mount and the mounting bracket coupled to the roll mount.

20 Claims, 4 Drawing Sheets

STRUCTURE FOR MOUNTING DRIVE DEVICE AND STEERING DEVICE ON VEHICLE BODY OF VEHICLE

CROSS-REFERENCE TO RELATED APPLICATIONS

This application claims priority to Korean Patent Application No. 10-2019-0391384, filed in the Korean Intellectual Property Office on Jul. 29, 2019, which application is hereby incorporated herein by reference.

TECHNICAL FIELD

The present invention relates to a structure for mounting a drive device and a steering device on a vehicle body of a vehicle.

BACKGROUND

A motor/speed reducer, which is a drive device for an electric vehicle in the related art, is mounted on and supported by a vehicle body through a subframe, and a gear box of a steering device is also mounted on and supported by the subframe.

That is, the subframe is fastened to a lower portion of a front vehicle body, one end of a mounting bracket is coupled to the subframe by welding, a connecting bracket is fastened to the motor/speed reducer, and the connecting bracket is fastened to the other end of the mounting bracket, such that the motor/speed reducer is mounted on the subframe through the connecting bracket and the mounting bracket.

In addition, the gear box of the steering device is fastened to and supported by an upper portion of the subframe.

However, in the case of the above-mentioned structure for mounting the drive device and the steering device on the vehicle body of the vehicle in the related art, it is difficult to share the subframe with a vehicle using an internal combustion engine, and a separate bracket needs to be added to the subframe to mount the motor/speed reducer assembly, which causes a problem with an increase in number of working processes, weight, and cost.

In addition, the above-mentioned structure cannot be applied to various types of gear boxes in common because of the arrangement structure of the gear box of the steering device, a roll mount of the motor/speed reducer assembly, and the motor/speed reducer. When a size of the motor is increased to improve a motor output, a size of the speed reducer is also increased. For this reason, a gap between the motor/speed reducer assembly and the subframe becomes insufficient. If the motor/speed reducer assembly is moved and disposed toward a front side of the vehicle in order to solve the insufficient gap, a size of the vehicle body is increased, which causes a problem with a decrease in degree of design freedom of the vehicle and an increase in weight and cost.

The above information disclosed in this Background section is only for enhancement of understanding of the background of the invention and therefore it may contain information that does not form the prior art that is already known in this country to a person of ordinary skill in the art.

SUMMARY

The present invention relates to a structure for mounting a drive device and a steering device on a vehicle body of a vehicle. Particular embodiments relate to a structure for mounting a drive device and a steering device on a vehicle body of a vehicle, the structure being configured to mount a motor/speed reducer assembly and a gear box of a steering device, as drive devices for an electric vehicle, on a subframe that constitutes a front vehicle body.

Embodiments of the present invention can provide a structure for mounting a drive device and a steering device on a vehicle body of a vehicle, the structure being capable of being used to apply various types of steering devices, to mount a motor/speed reducer assembly of the steering device without mounting a separate bracket on a subframe, and to apply, in common, a subframe to be mounted on an internal combustion engine.

An exemplary embodiment of the present invention provides a structure for mounting a driving device and a steering device on a vehicle body of a vehicle, in which a gear box of a steering device is mounted on a subframe, and a motor/speed reducer assembly is fastened to and supported by the gear box by means of a roll mount and a mounting bracket coupled to the roll mount.

The gear box may be a rack-driven gear box including a rack driving motor.

The motor/speed reducer assembly may be an assembly of a driving motor configured to operate a vehicle wheel, and a speed reducer configured to reduce an output speed of the driving motor, and based on the subframe, the speed reducer may be disposed to be closer to the subframe than the motor is to the subframe.

The roll mount may include a bushing and a bushing bracket configured to surround the bushing.

The bushing bracket may include two first and second bracket arms extending radially based on the bushing and spaced apart from each other.

The first bracket arm may be fastened to one side of the gear box by means of a fastening bolt, and the second bracket arm and the other side of the gear box may be fastened to the subframe by means of a mounting bolt.

The gear box may include a fastening boss provided at one side thereof so as to be fastened to the first bracket arm, and a fastening arm extending in the form of an arm so as to be fastened to the second bracket arm at the other side thereof.

The mounting bracket may include two fastening arms extending while forming an acute angle with respect to a fastening unit fastened to a center of the bushing, and the two fastening arms may be fastened to a casing of the speed reducer.

The center of the bushing may be disposed on the same line as a center (rack center) of the gear box.

The center of the bushing may be disposed around 15 mm forward or rearward from the center of the gear box.

A fastening arm fastened to the subframe may be provided in the gear box, the first bracket arm may be fastened to one side of the gear box by means of a fastening bolt, and the second bracket arm may be fastened to a lateral side of the fastening arm of the gear box.

BRIEF DESCRIPTION OF THE DRAWINGS

Because the drawings are provided for reference to describe exemplary embodiments of the present invention, the technical spirit of the present invention should not be construed as being limited to the accompanying drawings.

Figure 1:
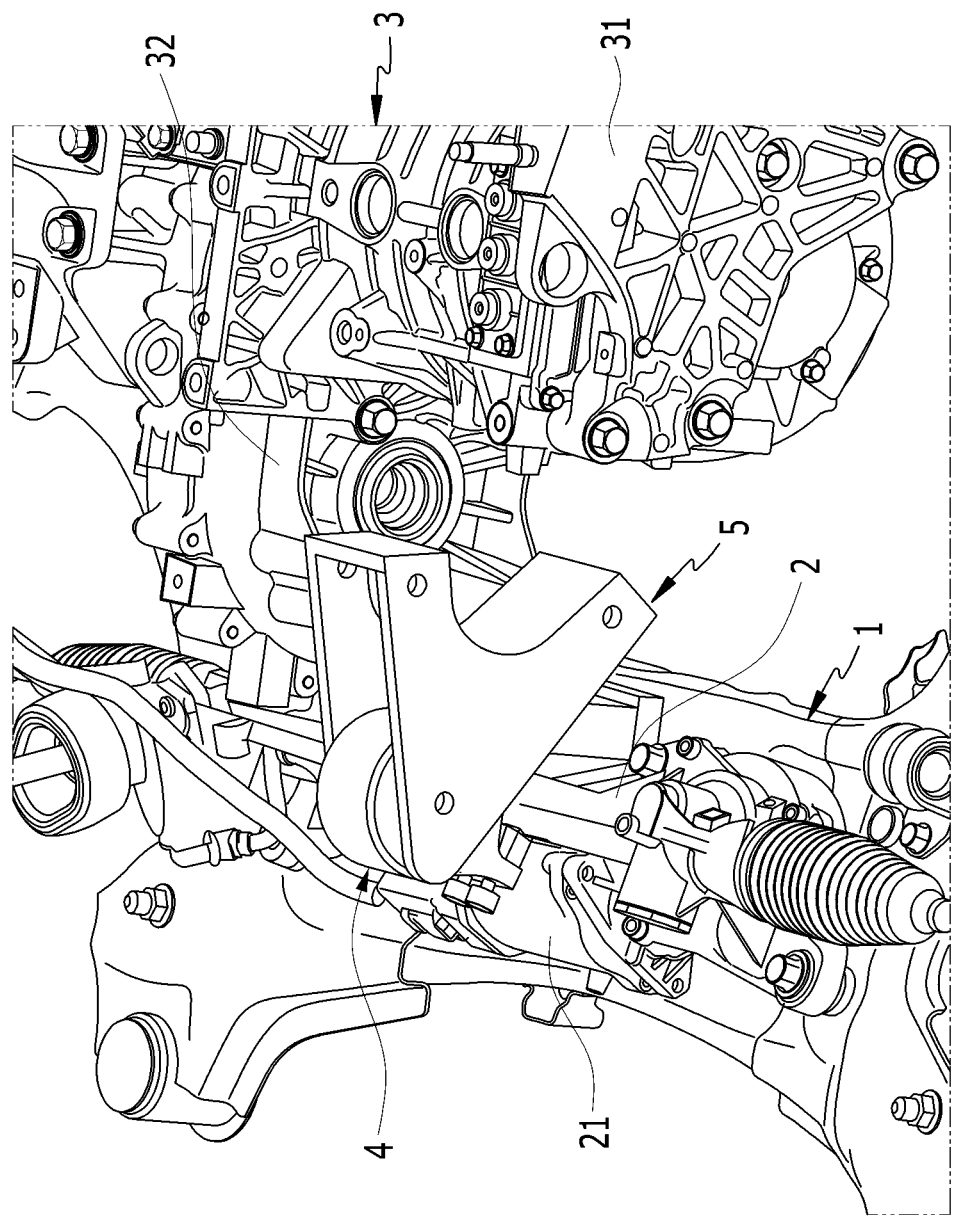
FIG. 1 is an exploded perspective view illustrating a structure for mounting a drive device and a steering device on a vehicle body of a vehicle according to an exemplary embodiment of the present invention.

The following reference numerals can be used in conjunction with the drawings:

1: Subframe
2: Gear box
3: Motor/speed reducer assembly
4: Roll mount
5: Mounting bracket
21: Rack-driven motor
22: Fastening bolt
23: Mounting bolt
24: Fastening boss
25: Fastening arm
31: Motor
32: Speed reducer
33: Casing
41: Bushing
42: Bushing bracket
43, 44: Bracket arm
51, 52: Fastening arm

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A part irrelevant to the description will be omitted to clearly describe the present invention, and the same or similar constituent elements will be designated by the same reference numerals throughout the specification.

The size and thickness of each component illustrated in the drawings are arbitrarily shown for ease of description, but the present invention is not limited thereto. In order to clearly describe several portions and regions, thicknesses thereof are enlarged.

Further, in the following detailed description, names of constituent elements are classified as a first . . . , a second . . . , and the like so as to discriminate the constituent elements having the same name, and the names are not essentially limited to the order in the description below.

Throughout the specification, unless explicitly described to the contrary, the word "comprise/include" and variations such as "comprises/includes" or "comprising/including" will be understood to imply the inclusion of stated elements, not the exclusion of any other elements.

Figure 2:
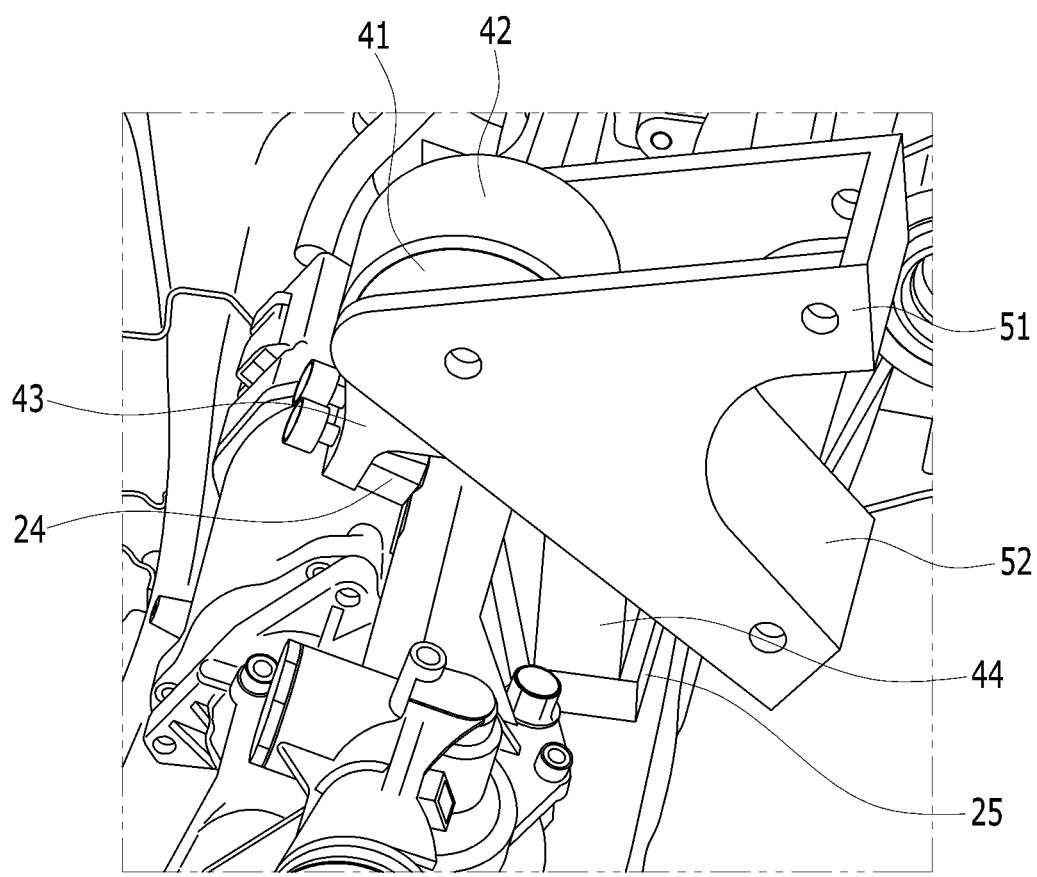
FIG. 2 is an enlarged perspective view of FIG. 1.
Figure 3:
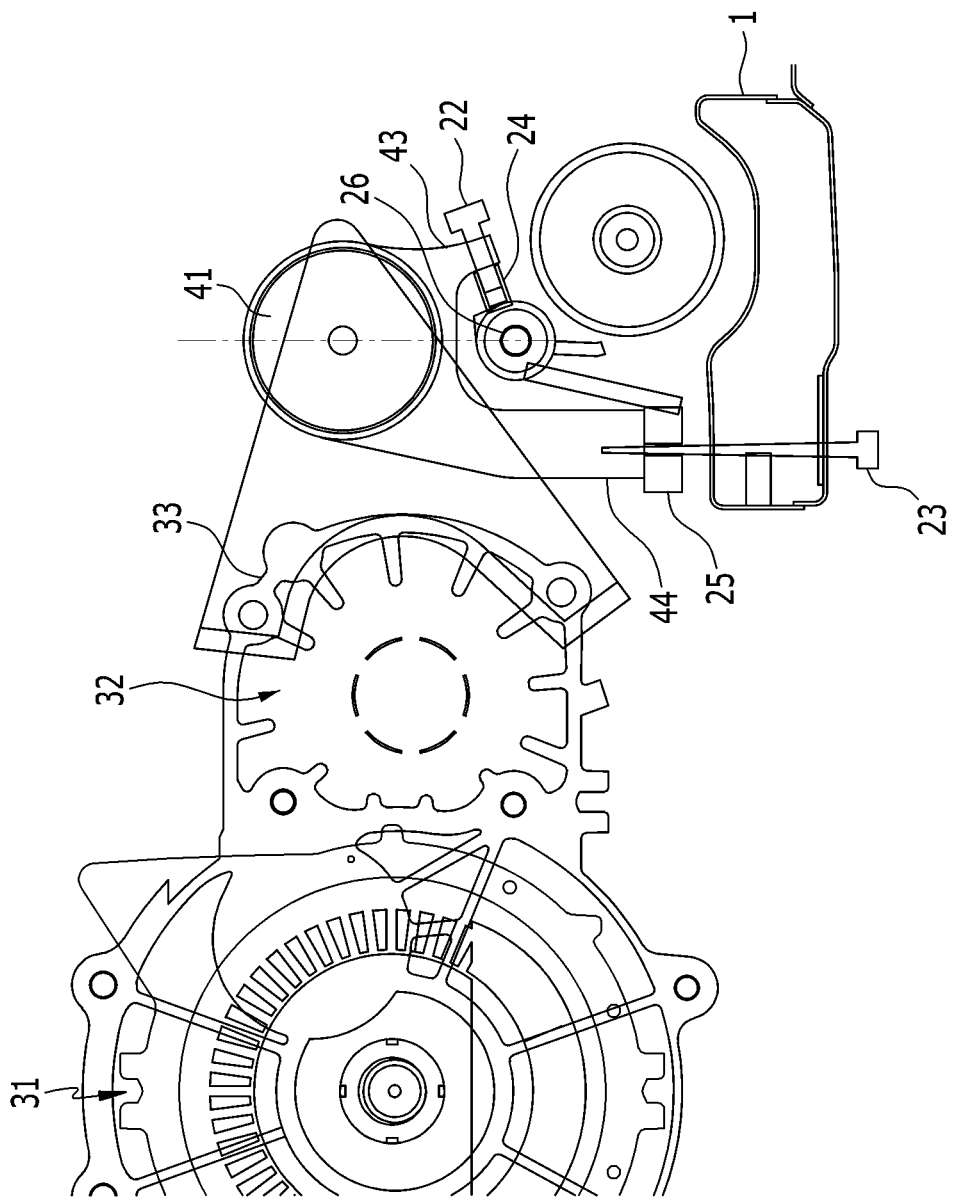
FIG. 3 is a cross-sectional view illustrating a state in which the drive device and the steering device are mounted on a subframe of the vehicle body of the vehicle in accordance with the exemplary embodiment of the present invention.

Referring to FIGS. 1 to 3, a structure for mounting a drive device and a steering device on a vehicle body of a vehicle according to an exemplary embodiment of the present invention may be mounted on a subframe 1 coupled to the vehicle body.

That is, a gear box 2 of the steering device may be fastened to and mounted on the subframe 1, and a motor/speed reducer assembly 3 may be fastened to and supported by the gear box 2 through a roll mount 4 and a mounting bracket 5.

The subframe 1 may be a subframe on which a suspension system for a front wheel is mounted and supported. The gear box 2 may be seated on and fastened to an upper surface of the subframe 1.

The gear box 2 may be a rack-driven gear box including a rack driving motor 21.

The motor/speed reducer assembly 3 may be an assembly of a driving motor 31 configured to operate a vehicle wheel, and a speed reducer 32 configured to reduce an output speed of the driving motor 31. Based on the subframe 1, the speed reducer 32 may be disposed to be closer to the subframe 1 than the motor 31 is to the subframe 1.

The roll mount 4 may include a bushing 41, and a bushing bracket 42 configured to surround the bushing 41.

The bushing bracket 42 may include two first and second bracket arms 43 and 44 extending radially based on the bushing 41 and spaced apart from each other.

The first bracket arm 43 may be fastened to one side of the gear box 2 by means of a fastening bolt 22, the second bracket arm 44 may be fastened to the other side of the gear box 2, and the other side of the gear box 2 may be fastened to the subframe 1.

In this case, both the other side of the gear box 2 and the second bracket arm 44 may be fastened to the subframe 1 by means of a mounting bolt 23. (see FIG. 3)

In the gear box 2, a fastening boss 24 configured to be fastened to the first bracket arm 43 may be provided, and a fastening arm 25, which extends in the form of an arm so as to be fastened to the second bracket arm 44, may be provided.

The second bracket arm 44 may be fastened by the mounting bolt 23 in a state in which the second bracket arm 44 is seated on the fastening arm 25 of the gear box 2.

The mounting bracket 5 may include two fastening arms 51 and 52 extending which forming an acute angle with respect to a fastening unit fastened to a center of the bushing 41.

The two fastening arms 51 and 52 are fastened to a casing 33 of the speed reducer 32 by means of bolts, such that the speed reducer 32 and the motor 31 may be supported by the gear box 2 through the mounting bracket 5 and the roll mount 4.

The center of the bushing 41 may be disposed on the same line as the center (rack center 26) of the gear box 2, but the center of the bushing 41 may be positioned around 15 mm forward or rearward from the center of the gear box 2.

The aforementioned configuration in which the center of the bushing 41 is positioned around 15 mm forward or rearward from the center of the gear box 2 may be set in consideration of durability, weights, costs, overhang reduction effects, and the like according to the size of the bushing of the roll mount and the shape of the roll mount bracket.

As described above, since the center of the bushing 41 of the roll mount 4 is disposed on the same line as the center of the gear box 2 or disposed around 15 mm forward or rearward from the center of the gear box 2, mounting spaces for the steering device and the motor/speed reducer assembly may be reduced. As a result, it is possible to improve a degree of design freedom of an engine room, apply a high-output and high-capacity motor, and increase a gear ratio, thereby improving an output and reducing front overhang.

Figure 4:
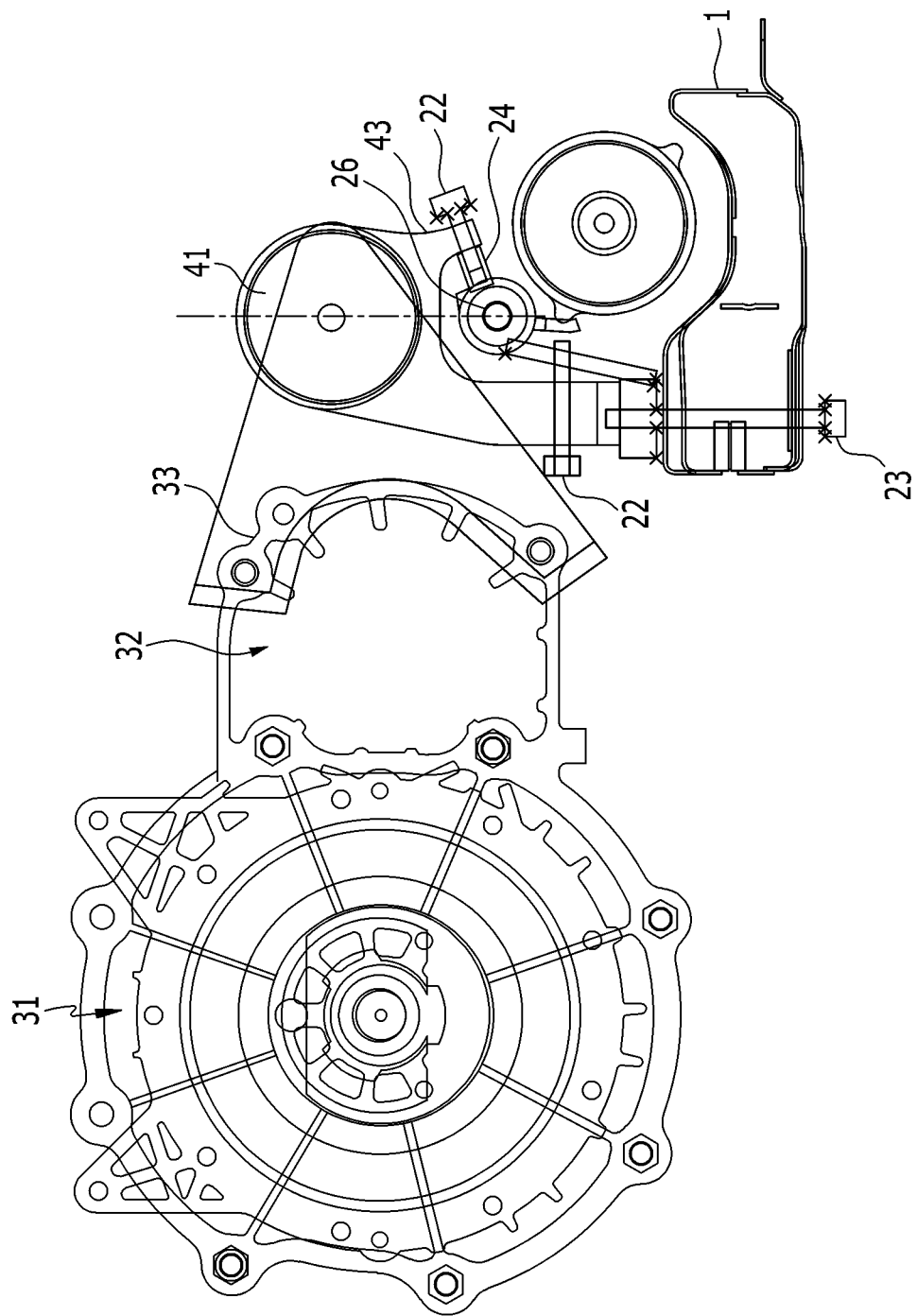
FIG. 4 is a cross-sectional view according to another exemplary embodiment of the present invention which corresponds to FIG. 3.

Meanwhile, referring to FIG. 4, the second bracket arm 44 of the bushing 41 may be fastened to a lateral side of the fastening arm 25 of the gear box 2, and only an end of the fastening arm 25 of the gear box 2 may be fastened to the subframe 1 by means of the mounting bolt 23.

The structure for mounting the drive device and the steering device on the vehicle body of the vehicle according to the exemplary embodiment of the present invention may be applied to various types of steering devices, for example, a rack-driven gear box type steering device, thereby improving steering responsiveness and marketability.

In addition, since the gear box of the steering device and the roll mount of the motor/speed reducer are disposed vertically, it is possible to ensure front and rear spaces of the vehicle and to increase a degree of design freedom of a front portion of the vehicle, and subframes and gear boxes of the internal combustion engines may be used in common because it is not necessary to add a separate bracket to the subframe.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A structure for mounting a driving device and a steering device on a vehicle body of a vehicle, the structure comprising:
    a gear box of the steering device mounted on a subframe;
    a roll mount;
    a mounting bracket coupled to the roll mount, wherein the mounting bracket comprises two fastening arms extending to form an acute angle with respect to a fastening unit fastened to a center of a bushing; and
    a motor/speed reducer assembly fastened to and supported by the gear box by the roll mount and the mounting bracket coupled to the roll mount, wherein the two fastening arms are fastened to a casing of a speed reducer of the motor/speed reducer assembly.

2. The structure of claim 1, wherein the gear box is a rack-driven gear box comprising a rack driving motor.

3. The structure of claim 1, wherein:
    the motor/speed reducer assembly is an assembly of a driving motor configured to operate a vehicle wheel;
    the speed reducer is configured to reduce an output speed of the driving motor; and
    based on the subframe, the speed reducer is disposed to be closer to the subframe than the motor is to the subframe.

4. The structure of claim 1, wherein the roll mount comprises the bushing and a bushing bracket configured to surround the bushing.

5. The structure of claim 4, wherein the bushing bracket comprises first and second bracket arms extending radially based on the bushing and spaced apart from each other.

6. The structure of claim 5, wherein the first bracket arm is fastened to one side of the gear box by means of a fastening bolt, and the second bracket arm and the other side of the gear box are fastened to the subframe with a mounting bolt.

7. The structure of claim 6, wherein the gear box comprises:
    a fastening boss provided at one side thereof so as to be fastened to the first bracket arm; and
    a gear box fastening arm extending so as to be fastened to the second bracket arm at the other side thereof.

8. The structure of claim 5, wherein:
    the gear box comprises a gear box fastening arm fastened to the subframe;
    the first bracket arm is fastened to one side of the gear box by a fastening bolt; and
    the second bracket arm is fastened to a lateral side of the fastening arm of the gear box.

9. The structure of claim 4, wherein a center of the bushing is disposed on the same line as a rack center of the gear box.

10. The structure of claim 4, wherein a center of the bushing is disposed around 15 mm forward or rearward from a center of the gear box.

11. A vehicle comprising:
    a vehicle body;
    a driving device mounted on the vehicle body;
    a steering device mounted on the vehicle body;
    a gear box of the steering device mounted on a subframe of the vehicle body;
    a roll mount;
    a mounting bracket coupled to the roll mount, wherein the mounting bracket comprises two fastening arms extending to form an acute angle with respect to a fastening unit fastened to a center of a bushing; and
    a motor/speed reducer assembly fastened to and supported by the gear box by the roll mount and the mounting bracket coupled to the roll mount, wherein the two fastening arms are fastened to a casing of a speed reducer of the motor/speed reducer assembly.

12. The vehicle of claim 11, wherein the gear box is a rack-driven gear box comprising a rack driving motor.

13. The vehicle of claim 11, further comprising a vehicle wheel, wherein the motor/speed reducer assembly is an assembly of a driving motor configured to operate the vehicle wheel and the speed reducer is configured to reduce an output speed of the driving motor, the speed reducer being disposed to be closer to the subframe than the driving motor is to the subframe.

14. The vehicle of claim 11, wherein the roll mount comprises the bushing and a bushing bracket configured to surround the bushing.

15. The vehicle of claim 14, wherein the bushing bracket comprises first and second bracket arms extending radially based on the bushing and spaced apart from each other.

16. The vehicle of claim 15, wherein the first bracket arm is fastened to one side of the gear box by means of a fastening bolt, and the second bracket arm and the other side of the gear box are fastened to the subframe with a mounting bolt.

17. The vehicle of claim 15, wherein:
    the gear box comprises a gear box fastening arm fastened to the subframe;
    the first bracket arm is fastened to one side of the gear box by a fastening bolt; and
    the second bracket arm is fastened to a lateral side of the fastening arm of the gear box.

18. The vehicle of claim 14, wherein a center of the bushing is disposed on the same line as a rack center of the gear box.

19. A structure for mounting a driving device and a steering device on a vehicle body of a vehicle, the structure comprising:
- a gear box of the steering device mounted on a subframe;
- a roll mount comprising a bushing and a bushing bracket configured to surround the bushing, wherein the bushing bracket comprises first and second bracket arms extending radially based on the bushing and spaced apart from each other, the first bracket arm being fastened to one side of the gear box by a fastening bolt and the second bracket arm and the other side of the gear box being fastened to the subframe with a mounting bolt;
- a mounting bracket coupled to the roll mount; and
- a motor/speed reducer assembly fastened to and supported by the gear box by the roll mount and the mounting bracket coupled to the roll mount.

20. The structure of claim 19, wherein the gear box comprises:
- a fastening boss provided at one side thereof so as to be fastened to the first bracket arm; and
- a fastening arm extending so as to be fastened to the second bracket arm at the other side thereof.

\* \* \* \* \*